Dec. 1, 1953

C. W. DEAN 2,660,884

SLIME MEASURING UNIT

Filed July 2, 1948

INVENTOR.
C. W. DEAN
BY
A. Yates Dowell
ATTORNEY

Dec. 1, 1953   C. W. DEAN   2,660,884
SLIME MEASURING UNIT
Filed July 2, 1948
2 Sheets-Sheet 2

INVENTOR.
C. W. DEAN
BY
*A. Yates Dowell*
ATTORNEY

UNITED STATES PATENT OFFICE 2,660,884

SLIME MEASURING UNIT

Charles W. Dean, Memphis, Tenn., assignor to Buckman Laboratories, Inc., Memphis, Tenn., a corporation of Tennessee Application July 2, 1948, Serial No. 36,746

2 Claims. (Cl. 73—53)

This invention relates to the detection of the presence of certain types of microorganism growth in liquids, and more particularly to a device for measuring the growth of slime in pulp and paper systems.

In the paper industry the growth of slime in the pulp and mill systems must be frequently checked and regulated, and as a result a means for determining the rate of growth of slime in the systems is of great importance. In the past this has been carried out by indirect methods such as bacterial colony counts and the like, these methods however having suffered from various deficiencies such as requiring highly skilled personnel, and inaccuracy of results.

Accordingly it is an object of the present invention to provide a slime measuring unit which may be used to directly indicate a growth of slime in a given system.

A further object of the invention is the provision of a simple and inexpensive device adapted for the accurate measurement of the rate of growth of slime, and which does not require highly trained personnel for its proper use.

A further object of the invention is the provision of a device for the measurement of the rate of growth of slime in a system and which is so constructed that accurate measurement based on uniform flow may be made even though variations in the head of liquid being measured occur.

These and other objects of the invention will be apparent from the following specification taken in conjunction with the accompanying drawing, wherein.

Figure 1:
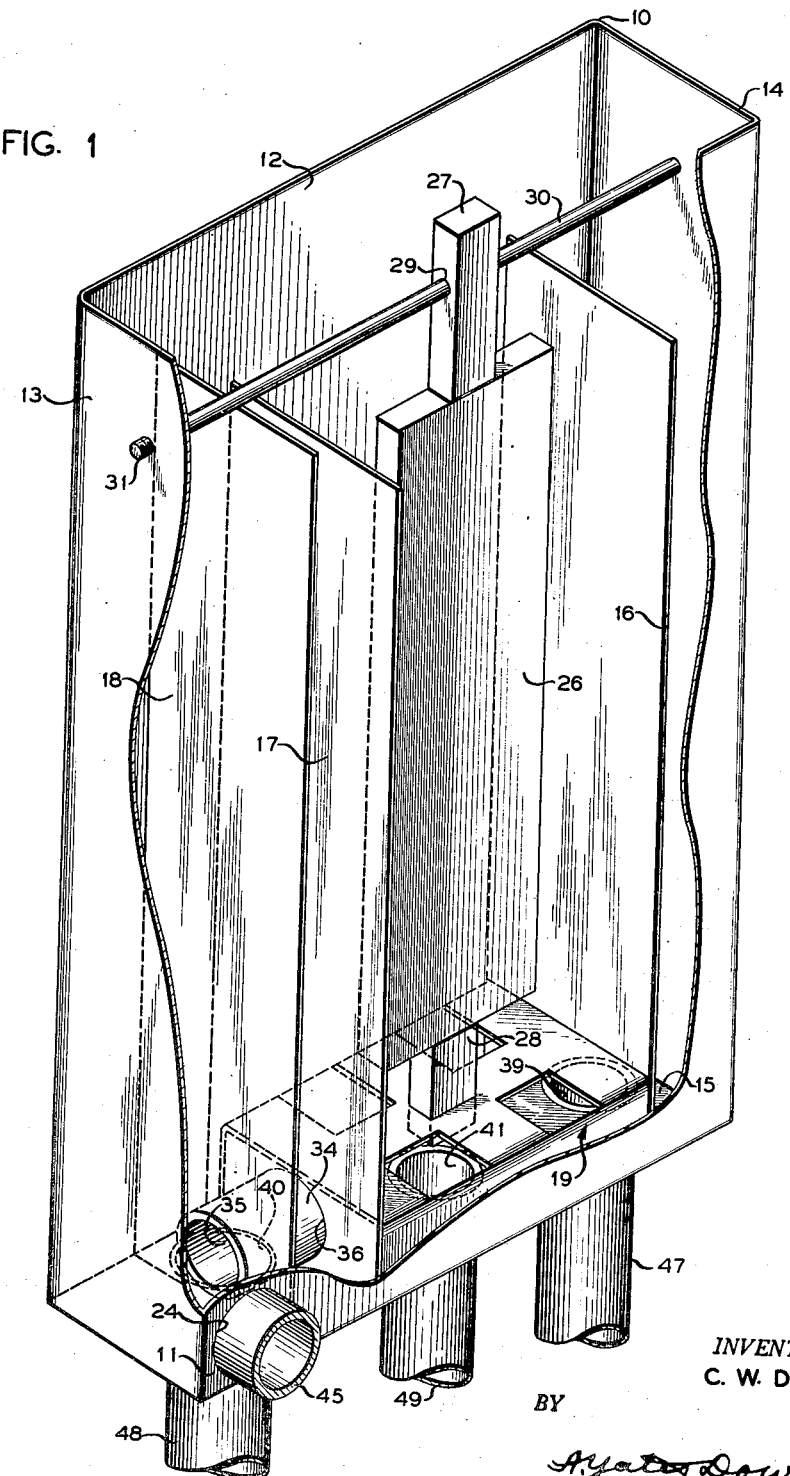
Fig. 1 is a perspective, partly in section, of the slime measuring unit.

Referring to the drawings, a slime measuring unit in accordance with the present invention is shown and comprises a substantially rectangular housing 10 having relatively broad side walls 11 and 12 and relatively narrow side walls 13 and 14. An end wall 15 is provided for one end of the housing, the other end being left open. Within the housing spacer members or baffles 16 and 17 are secured to the side walls 11 and 12, and a baffle 18 of greater length than baffles 16 and 17 is spaced between the baffle 17 and side wall 13. A false or raised bottom 19 is positioned between the baffles 16 and 17 and rests on the end wall 15 of the housing.

The false bottom includes a web portion 20 supported by side walls 21. The web portion 20 includes a plurality of spaced apertures 22 adapted for the passage of liquid and a central aperture 23 for supporting and locating a test panel, as will be described later. For admitting liquid into the housing an inlet aperture 24 is placed in a lower corner of the housing the axis of this aperture being parallel to the side walls 13 and 14 thereof. The inlet is positioned with its lower boundary substantially coincident with the inner surface of the end wall 15 of the housing in order that solid material, such as fiber, in the liquid flowing into the housing, will not be deposited in the housing adjacent the inlet. It has been found that if the inlet is raised a small amount above the floor of end wall 15 of the housing that fibers and the like will be deposited adjacent thereto which in a relatively short time will impede the free flow of fluid into the housing.

The compartment or channel 25 defined by the baffles 16 and 17 and the web portion 20 of the false bottom 19 provides a chamber or main compartment in which a test panel 26 may be positioned in order that liquid from the system being tested may flow over the panel and deposit slime thereon.

The test panel comprises a substantially elongated slab of wood and has end portions or extensions 27 and 28 for positioning the panel in its compartment. The panel is preferably made from a low extractive sapwood such as sugar pine, northern white pine, or ponderosa pine which is free of knots and other faults. The extension 27 has a transverse bore 29 through which a stainless steel rod 30 is passed, the rod having a threaded end 31 for engagement with the side wall 13 of the housing. The rod passes through an aperture 32 in the side wall 14 of the housing, and a handle 33 is formed thereon by means of which it may be manipulated. It is apparent therefore that the rod provides a removable support for the panel. The extension 28 of the panel is positioned in the aperture 23 of the web portion 20 of the false bottom 19.

For conducting fluid from the inlet 24 of the compartment 25 a short length of pipe or conduit 34 is positioned adjacent the floor or end wall 15 of the housing substantially along the longitudinal center line thereof. This pipe has one end secured in liquid-tight engagement in an aperture 35 in the baffle 18 and its other end in liquid-tight engagement in an aperture 36 in the baffle 17. It is apparent therefore that liquid entering the inlet 24 makes a right angle turn to pass through the conduit 34 and into the space defined by the false bottom 19 and the lower portions of baffles 16 and 17. From this space the liquid may rise through the apertures 22 in the web portion 20 of the false bottom and fill the compartment 25 in which the test panel is positioned.

After the liquid reaches the uppermost edge of the baffles 16 and 17 it overflows into the compartment or channel 37 of the housing between the baffle 16 and the side wall 14 and into the compartment 38 in the housing between the baffles 17 and 18. An outlet 39 in the end wall 15 is provided for the compartment 37 and an outlet 40 is provided in the end wall for the compartment 38. A normally closed outlet 41 in the end wall 15 in the space enclosed by the false bottom 19 is provided for draining the housing when desired. It is apparent that liquid entering the inlet 24, in addition to flowing into the conduit 34, also flows into the compartment or by-pass channel 42 in the housing between side wall 13 and the baffle 18. The water rises in this compartment until at a sufficient level to flow over the top of the baffle 18, which is at a higher level than the baffles 16 and 17 when the device is in position for operation, and then into the compartment 38.

Because of the construction of the housing and the positioning of the baffles therein, there is a balancing of flow between the panel compartment and the overflow compartments, and, because of the location and size of the apertures in the false bottom 19, there is a smooth even flow through the false bottom into the panel compartment. A further advantage is that the false bottom compartment is easily removable for cleaning or other purpose when necessary.

Figure 3:
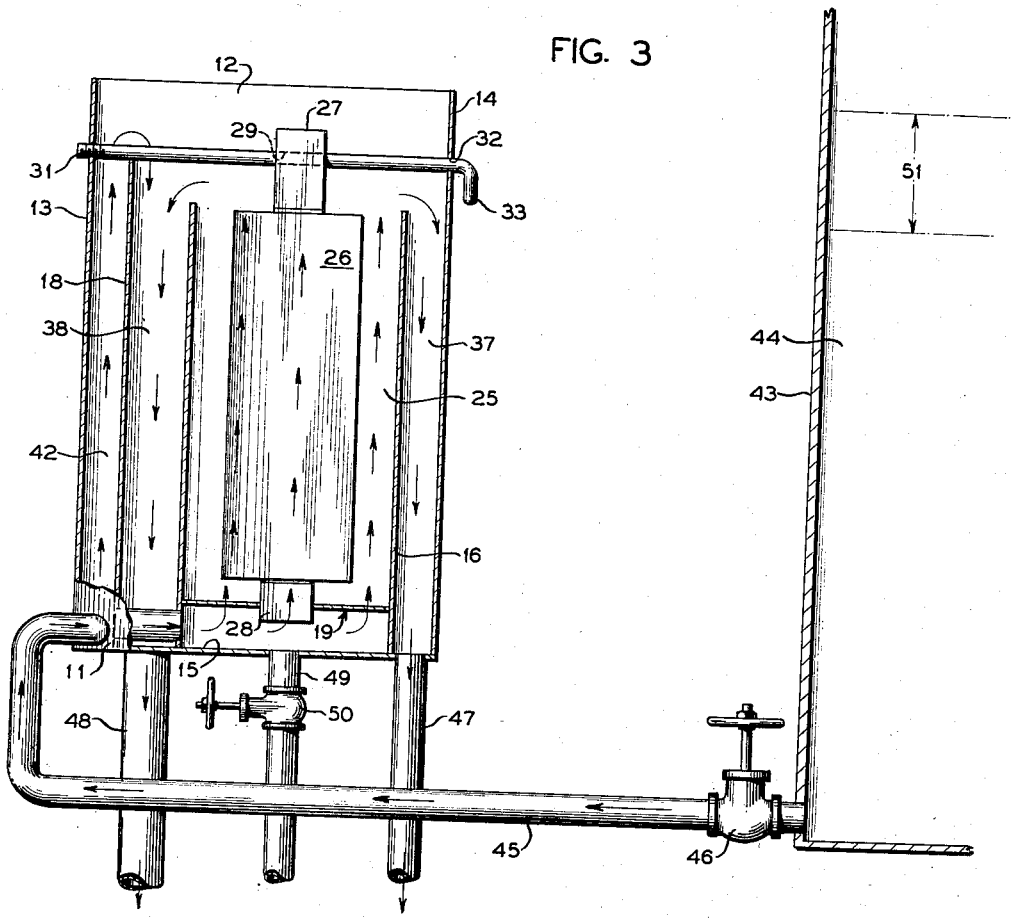
Fig. 3 is a diagrammatic illustration of the use of the device.
Figure 2:
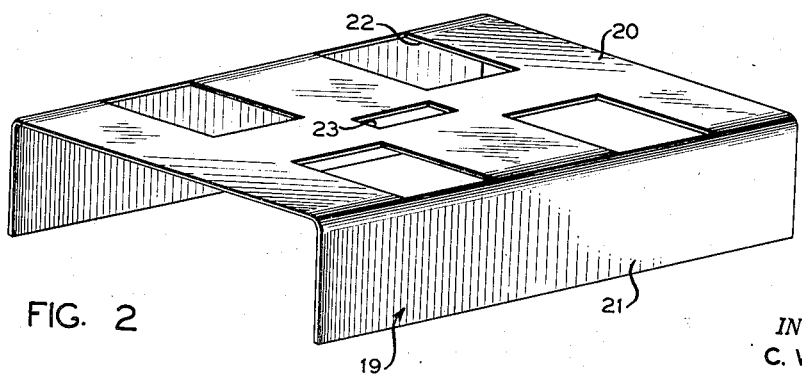
Fig. 2 is a perspective of the false bottom employed in the unit.

Fig. 3 illustrates one method of setting up the unit for operation. Here a machine head box, cylinder vat, or flowbox 43 containing diluted stock or white water 44 has a conduit 45 connected to the lower portion thereof, a valve 46 being provided therein for off-on control only. The conduit 45 leads to the inlet 24 of the slime measuring unit and outlet pipes or conduits 47 and 48 are attached to the outlets 39 and 40 respectively of the unit. An outlet pipe 49 with a valve 50 is attached to the drain outlet 41 of the unit.

Although the dimensions of the unit and its slime panel may be varied, it is convenient to employ a panel so dimensioned that at saturation, it will have one thousand square centimeters of exposed area on its sides and edges (not including the two end surfaces) in order to simplify the computation of the amount of slime deposited per unit of surface area. It has also been found that for a given unit it is necessary to maintain a certain head of liquid in the vat 43 above the uppermost edge of the test panel in position. For example, in its installation in which the compartment 25 occupied by the slime panel is 14¼ inches long and the baffle 18 extends above the space 1¾ inches, it is necessary to maintain a head of liquid 51 above the upper edge of the test panel of 12 inches.

Utilizing the minimum head, uniform flow takes place through the compartment occupied by the test panel, and variations in the head up to approximately ten times the minimum head do not change the flow through the space occupied by the test panel. The reasons for this are apparent from an inspection of Fig. 3. Assuming that the minimum head is present in the vat 43 and that the valve 46 is open to permit flow to the unit, the liquid flows into the unit through the inlet 24 and a part thereof passes through conduit 34, under the false bottom 19, and upward into the test compartment 25. Part of the flow entering the inlet 24 also rises into compartment 42. With the minimum head the liquid in compartment 25 overflows into the compartment 37 having the outlet 47 and into the relatively larger compartment 38 having the outlet 48. The liquid in the compartment 42 rises to the top of the baffle 18 and overflows into the compartment 38. If the head within the vat 43 is greater than the minimum, it is apparent that more liquid will be by-passed through the space 42 and into the space 38. In other words, provided that the head of liquid in the vat is sufficient to cause the liquid flowing into the housing to flow over the baffle 18, increases in head are compensated for in the housing by a greater flow over the baffle 18 so that the flow through the compartment 25 remains substantially constant.

Before accurate measurement of the rate of growth of slime on a test panel may be obtained, the panel must be installed in a unit for a conditioning period of about two weeks. After this conditioning period, slime will readily accumulate on the surface of the panel and it may then be used for obtaining test data. In use, the wooden panel should be removed from the unit and observed each day. If a visible accumulation of slime is present, the panel should be held until the water ceases to run off of it in a steady stream and begins to drip. Then the slime, consisting of microorganisms, entrained fibers, and water, is thoroughly scraped from the sides and edges of the panel into a beaker or the like by means of a rubber or wooden spatula. The weight of the slime collected may be expressed in suitable units such as grams per thousand square centimeters of panel surfaces per 24 hours.

It is apparent that the present invention contemplates a simple, light weight, and durable device by means of which an indication of the rate of growth of slime in a liquid may be obtained.

It will be obvious to those skilled in the art that various changes may be made in the invention without departing from the spirit and scope thereof and therefore the invention is not limited to that which is shown in the drawing and described in the specification but only as indicated in the appended claims.

What is claimed is:

1. A device for measuring the slime in a liquid comprising a vessel having an open top, said vessel having an inlet aperture adjacent its bottom for admitting liquid and a plurality of liquid discharge apertures in its bottom, a plurality of vertical partitions in said vessel forming compartments, one of said compartments constituting a liquid by-pass, a test panel disposed in another of said compartments, the remaining compartments communicating with said discharge apertures, means for conducting liquid from said inlet aperture to the lower end of said panel containing compartment whereby said liquid may flow upwardly therethrough, said inlet aperture also communicating with said by-pass compartment adjacent the lower end thereof whereby liquid may flow upwardly through said panel containing compartment being discharged into said remaining compartments for downward flow therethrough, any excess liquid flowing through said inlet aperture occasioned by an increase of head thereon flowing upwardly through said by-pass compartment and being discharged downwardly through one of said remaining compartments thus maintaining a substantially constant flow of liquid through said panel containing compartment whereby slime will be deposited on said test panel in substantially direct proportion to the slime in said liquid.

2. A device for determining the slime in liquid which comprises wall structure defining a housing having a circuitous passage, a portion of said passage constituting a measuring chamber, a conduit attached to said housing to admit liquid to said passage and thereby to said chamber, a by-pass connection in said housing preceding the admission of liquid to said passage to by-pass liquid in excess of that desired in said measuring chamber, a removable test panel mounted within said measuring chamber to contact liquid in said chamber, and a conduit on said housing to discharge liquid from said passage.

CHARLES W. DEAN.

References Cited in the file of this patent
UNITED STATES PATENTS

| Number | Name | Date |
|---|---|---|
| 1,019,580 | Ziemann | Mar. 5, 1912 |
| 1,178,973 | Trimby | Apr. 11, 1916 |
| 1,683,489 | Rice | Sept. 4, 1928 |
| 2,090,077 | Thorne | Aug. 17, 1937 |
| 2,351,644 | Talley et al. | June 20, 1944 |
| 2,444,668 | Poirier | July 6, 1948 |
| 2,484,279 | Folz | Oct. 11, 1949 |
| 2,519,323 | Shank et al. | Aug. 15, 1950 |

OTHER REFERENCES

The Paper Industry and Paper World, vol. 29, No. 10, January 1948, pages 1502–1505.